Jan. 8, 1924.  
V. H. EMERSON  
PHONOGRAPH RECORD DEVICE  
Filed Nov. 27, 1922  
1,479,794  
2 Sheets-Sheet 1

INVENTOR  
Victor H. Emerson  
BY  
HIS ATTORNEY

Jan. 8, 1924.

V. H. EMERSON

PHONOGRAPH RECORD DEVICE

Filed Nov. 27, 1922

1,479,794

2 Sheets-Sheet 2

INVENTOR
Victor H. Emerson
BY
W Ray Emerson
HIS ATTORNEY

Patented Jan. 8, 1924.

1,479,794

UNITED STATES PATENT OFFICE.

VICTOR H. EMERSON, OF NEW YORK, N. Y., ASSIGNOR TO KIDDIE REKORD COMPANY, INC., OF PLAINFIELD, NEW JERSEY, A CORPORATION OF NEW JERSEY.

PHONOGRAPH-RECORD DEVICE.

Application filed November 27, 1922. Serial No. 603,587.

*To all whom it may concern:*

Be it known that I, VICTOR H. EMERSON, a citizen of the United States, residing in the city, county, and State of New York, have invented new and useful Improvements in Phonograph-Record Devices, of which the following is a specification.

This invention relates to educational and entertaining devices for children and has for an object to provide an improved device with which children may be both audibly and visually entertained, educated and amused, which serves as a medium for the self-instruction of children who are unable to read by teaching them stories and songs, particularly nursery rhymes and songs, and which is attractive, simple and inexpensive. Various other objects and advantages will be apparent from the following description of an embodiment of the invention, and the novel features will be hereinafter pointed out in claims.

Figure 1:

In the accompanying drawing, Figure 1 is a view showing the reverse side of a record of my invention containing a full sized species illustration.

Figure 2:
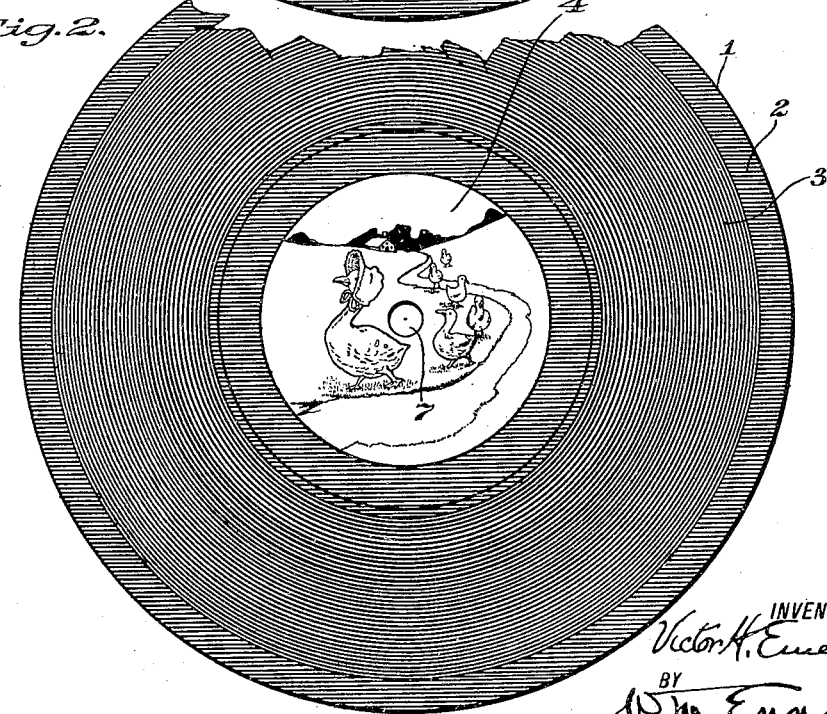
Figure 3:

Fig. 2 is the top side of the record showing sound grooves and the generic illustration centrally disposed thereon. Fig. 3 is a view of the reverse side of another record of the series.

In the particular embodiment of the invention which is illustrated, a disc 1 of suitable material, such as that commonly used for the manufacture of sound record discs, is provided upon and in one face 2 thereof with a sound record groove 3 extending progressively between an annular peripheral area and a central label portion 4. The groove may have therein undulations corresponding to sound waves whereby when the disc is played upon a talking machine, an audible reproduction of the original sound waves will be produced. The recorded subject matter may be stories or songs, such as nursery rhymes, many of which are called "Mother Goose" stories and songs. The central label portion 4 carries a pictorial illustration typical or suggestive of the nursery rhymes and songs as a class or series of records to which this particular record device belongs.

The opposite face 5 of the disc 1 is provided with a pictorial illustration 6 of the action of the subject matter recorded upon the other reverse face of the disc. For example, the label 4 may have a picture of a mother goose and little geese, to designate a class or series of Mother Goose stories and songs, and the illustration upon the face 5 may illustrate the acts or events forming the basis of the story or song which is recorded upon the face 2. The illustration 6 preferably comprises the major portion of the face 5 of the disc so as to be as complete as possible. The disc may have a small central aperture 7 through which the spindle of a talking machine may pass when the record is played.

The children look through record discs and learn to identify the nursery rhyme and story records by the general pictorial label, and upon the opposite face they find the action of the subject matter of the record illustrated so that they can identify and distinguish one record from another. They may examine the pictures of the action, and, whether or not they are able to read printed reading matter, they will be able to understand the subject matter of the record, and by playing the record they hear the story or song rendered in a pleasing and artistic manner. They thus learn to connect the pictures and songs or stories, and learn and remember the subject matter thereof, which serves not only to entertain and amuse them, but to educate them as well.

It will be understood that various changes may be made in the details herein explained as a concrete example of the invention, within the principle and scope of the invention, as set forth in the appended claims.

I claim:

1. An educational and entertaining device for children comprising a pictorially corelated series of sound record discs each having upon one face a sound record of selected subject matter and a pictorial representation of subject matter common to all the members of the series, and upon the reverse face a pictorial illustration of the action of the subject matter recorded upon the first mentioned face.

2. An educational and entertaining device for children comprising a sound record disc having upon one face a sound record of selected subject matter with a central label carrying a pictorial representation of the class of subject matter that is recorded thereon as one of a related series, and upon the reverse face a pictorial illustration of the action of the subject matter recorded upon the first mentioned face and designated generically by the pictorial label thereon.

3. An educational and entertaining device for children comprising a sound record disc having upon its face a sound record of a Mother Goose story or song with a central label carrying a pictorial illustration suggestive of mother goose as a class or series of stories and songs upon records, and upon the other face with a pictorial illustration of the action of the song or story recorded upon the first mentioned face.

In testimony whereof I have hereunto set my hand.

VICTOR H. EMERSON.